US012283821B2

United States Patent
Fu et al.

(10) Patent No.: US 12,283,821 B2
(45) Date of Patent: Apr. 22, 2025

(54) CONTROL METHOD AND APPARATUS FOR HIGH-VOLTAGE, DIRECT CURRENT FIRST COMMUTATION FAILURE IN ALTERNATING-CURRENT FAULT

(71) Applicants: ELECTRIC POWER RESEARCH INSTITUTE. CHINA SOUTHERN POWER GRID, Guangdong (CN); CHINA SOUTHERN POWER GRID, Guangdong (CN)

(72) Inventors: Chuang Fu, Guangdong (CN); Ruina Zheng, Guangdong (CN); Juanjuan Wang, Guangdong (CN); Zhaoxin Wen, Guangdong (CN); Huan Li, Guangdong (CN); Wei Wei, Guangdong (CN)

(73) Assignees: ELECTRIC POWER RESEARCH INSTITUTE. CHINA SOUTHERN POWER GRID, Guangdong (CN); CHINA SOUTHERN POWER GRID, Guangdong (CN)

(*) Notice: Subject to any disclaimer, the term of this patent is extended or adjusted under 35 U.S.C. 154(b) by 18 days.

(21) Appl. No.: 18/552,666

(22) PCT Filed: Sep. 13, 2021

(86) PCT No.: PCT/CN2021/118052
§ 371 (c)(1),
(2) Date: Sep. 27, 2023

(87) PCT Pub. No.: WO2022/205786
PCT Pub. Date: Oct. 6, 2022

(65) Prior Publication Data
US 2024/0162714 A1 May 16, 2024

(30) Foreign Application Priority Data
Mar. 31, 2021 (CN) .......................... 202110352380.5

(51) Int. Cl.
*H02J 3/36* (2006.01)
*H02J 3/00* (2006.01)
*H02M 7/48* (2007.01)

(52) U.S. Cl.
CPC ................ *H02J 3/36* (2013.01); *H02J 3/001* (2020.01); *H02M 7/48* (2013.01); *H02J 2203/00* (2020.01)

(58) Field of Classification Search
None
See application file for complete search history.

(56) References Cited

U.S. PATENT DOCUMENTS

2008/0315809 A1   12/2008  Tamaizumi
2015/0256094 A1*   9/2015  Chaudhuri .......... H02M 7/7575
                                                         363/35

(Continued)

FOREIGN PATENT DOCUMENTS

CN     106887859 A    6/2017
CN     110441658 A    11/2019

(Continued)

OTHER PUBLICATIONS

International Search Report for PCT/CN2021/118052 mailed Dec. 30, 2021, ISA/CN.

*Primary Examiner* — Jared Fureman
*Assistant Examiner* — Aqeel H Bukhari
(74) *Attorney, Agent, or Firm* — Yue (Robert) Xu; Apex Attorneys at Law, LLP

(57) ABSTRACT

A method, an apparatus and a device for suppressing a first HVDC commutation failure under an AC system fault are provided. The method includes: obtaining a three-phase voltage of a converter bus, and calculating a zero-sequence component amplitude and an αβ component amplitude; calculating a first trigger-angle command for a single-phase fault and a second trigger-angle command for a three-phase (Continued)

fault; selecting a smaller one of the first trigger angle command and the second trigger angle command as a trigger-angle command for an extinction-angle controller; and adjusting a trigger angle of the HVDC transmission system by using the trigger-angle command as an upper limit value for an output of the extinction-angle controller of the HVDC transmission system.

10 Claims, 6 Drawing Sheets

(56) References Cited

U.S. PATENT DOCUMENTS

| | | | |
|---|---|---|---|
| 2018/0175739 A1* | 6/2018 | Wang | H02J 3/06 |
| 2019/0052087 A1* | 2/2019 | Zhao | H02M 5/4585 |
| 2020/0177071 A1* | 6/2020 | Zhang | H02M 7/7575 |

FOREIGN PATENT DOCUMENTS

| | | |
|---|---|---|
| CN | 110571839 A | 12/2019 |
| CN | 111541261 A | 8/2020 |
| CN | 112993994 A | 6/2021 |
| JP | 2016025720 A | 2/2016 |

\* cited by examiner

Obtain a three-phase voltage of a converter bus in the HVDC transmission system, and calculating a zero-sequence component amplitude and an αβ component amplitude of the three-phase voltage of the converter bus — S10

Obtain a setting value of an extinction angle of the HVDC transmission system, a per unit value of a short-circuit reactance of a converter, a per unit value of a DC current, a commutation time and an impedance ratio, and calculate a first trigger-angle command for a single-phase fault and a second trigger-angle command for a three-phase fault according to the zero-sequence component amplitude and the αβ component amplitude — S20

Select a smaller one of the first trigger angle command and the second trigger angle command as a trigger-angle command for an extinction-angle controller controlling a converter valve in the converter — S30

Adjust a trigger angle of the HVDC transmission system by using the trigger-angle command for an extinction-angle controller as an upper limit value for an output of the extinction-angle controller of the HVDC transmission system — S40

Figure 1

CONTROL METHOD AND APPARATUS FOR HIGH-VOLTAGE, DIRECT CURRENT FIRST COMMUTATION FAILURE IN ALTERNATING-CURRENT FAULT

This application is the national phase of International Patent Application No. PCT/CN2021/118052, titled "CONTROL METHOD AND APPARATUS FOR HIGH-VOLTAGE, DIRECT CURRENT FIRST COMMUTATION FAILURE IN ALTERNATING-CURRENT FAULT", filed on Sep. 13, 2021, which claims the priority to Chinese Patent Application No. 202110352380.5, titled "CONTROL METHOD AND APPARATUS FOR HIGH-VOLTAGE, DIRECT CURRENT FIRST COMMUTATION FAILURE IN ALTERNATING-CURRENT FAULT", filed on Mar. 31, 2021 with the Chinese Patent Office, both of which are incorporated herein by reference in their entireties.

FIELD

The present disclosure relates to the field of electric power technology, and in particular to a method, an apparatus and a device for suppressing a first high-voltage direct-current (HVDC) commutation failure under an alternative current (AC) system fault.

BACKGROUND

When an AC system on the inverter side of a high-voltage direct current (HVDC) transmission system fails, the amplitude of the voltage at the converter bus drops sharply, the phase jumps, and the extinction angle of a converter valve will decrease sharply in a short time. The purpose of controlling the extinction angle of the converter valve is to maintain the extinction angle not less than a threshold value to ensure normal shut-off of the converter valve. However, in the transient state, a conventional extinction angle regulator commonly used in DC engineering has a slow response and a large control error, easily resulting in commutation failure of the inverter when an AC system fault occurs.

Therefore, it is desired to improve the extinction angle controller, to increase the commutation margin of each converter valve in case of AC system faults and thus reduce the commutation failure of the inverter in case of AC system faults.

SUMMARY

Embodiments of the present disclosure provide a method, an apparatus, and a device for suppressing a first HVDC commutation failure under an AC system fault, which are used to solve the technical problem of commutation failure of a converter in an existing HVDC transmission system under an AC system fault.

In order to achieve the above objects, embodiments of the present disclosure provide the following technical solutions.

A method for suppressing a first high-voltage direct-current (HVDC) commutation failure under an alternative current (AC) system fault, applied to an HVDC transmission system, includes the following steps:
  obtaining a three-phase voltage of a converter bus in the HVDC transmission system, and calculating a zero-sequence component amplitude and an $\alpha\beta$ component amplitude of the three-phase voltage of the converter bus;
  obtaining a setting value of an extinction angle of the HVDC transmission system, a per unit value of a short-circuit reactance of a converter, a per unit value of a DC current, a commutation time and an impedance ratio, and calculating a first trigger-angle command for a single-phase fault and a second trigger-angle command for a three-phase fault according to the zero-sequence component amplitude and the $\alpha\beta$ component amplitude;
  selecting a smaller one of the first trigger angle command and the second trigger angle command as a trigger-angle command for an extinction-angle controller controlling a converter valve in the converter; and
  adjusting a trigger angle of the HVDC transmission system by using the trigger-angle command for the extinction-angle controller as an upper limit value for an output of the extinction-angle controller of the HVDC transmission system.

Preferably, the obtaining a three-phase voltage of a converter bus in the HVDC transmission system, and calculating a zero-sequence component amplitude and an $\alpha\beta$ component amplitude of the three-phase voltage of the converter bus includes:
  obtaining the three-phase voltage of the converter bus in the HVDC transmission system, where the three-phase voltage includes a Phase A voltage $u_A$, a Phase B voltage $u_B$, and a Phase C voltage $u_C$;
  deriving a zero-sequence component, a $\alpha$ component and a $\beta$ component by substituting the Phase A voltage $u_A$, the Phase B voltage $u_B$, and the Phase C voltage $u_C$ into a zero-sequence component formula and a Clark transformation formula;
  calculating the zero-sequence component amplitude $U_0$ by applying a maximum value holding function on the zero-sequence component; and
  calculating a pre-$\alpha\beta$ component amplitude $U_L$ by applying a commutation voltage formula on the $\alpha$ component and the $\beta$ component, and calculating the $\alpha\beta$ component amplitude $U_L'$ by applying a minimum value holding function on the pre-$\alpha\beta$ component amplitude $U_L$.

Preferably, the zero-sequence component formula is $$u_0 = \left(\frac{u_A + u_B + u_C}{3}\right);$$

the Clark transformation formula is:

$$\begin{bmatrix} u_\alpha \\ u_\beta \end{bmatrix} = \frac{1}{3}\begin{bmatrix} 2 & -1 & -1 \\ 0 & \sqrt{3} & -\sqrt{3} \end{bmatrix}\begin{bmatrix} u_A \\ u_B \\ u_C \end{bmatrix}$$

the maximum value holding function is: $U_0 = \text{MAX\_HOLD}(|u_0|)$;
the commutation voltage formula is: $U_L = \sqrt{3u_\alpha^2 3u_\beta^2}$; and
the minimum value holding function is: $U_L' = \text{MAX\_HOLD}(|U_L|)$.

Preferably, the method for suppressing a first HVDC commutation failure under an AC system fault further includes: maintaining an absolute value of the zero-sequence component and an absolute value of the pre-$\alpha\beta$ component amplitude for 12 ms, to calculate the zero-sequence component amplitude $U_0$ and the $\alpha\beta$ component amplitude $U_L'$.

Preferably, the method for suppressing a first HVDC commutation failure under an AC system fault further includes: substituting the setting value of the extinction angle of the HVDC transmission system, the per unit value of the short-circuit reactance of the converter, the per unit value of the DC current, the commutation time and the impedance ratio, the zero-sequence component magnitude and the αβ component magnitude into a single-phase trigger-angle calculation formula and a three-phase trigger-angle calculation formula to respectively obtain the first trigger-angle command $\alpha_{sig}$ for the single-phase fault and the second trigger-angle command $\alpha_{thr}$ for the three-phase fault, where the single-phase trigger-angle calculation formula is:

$$\alpha_{3y.ord} = \arccos\left[\frac{X_T^*\left(2I_d^* + T\frac{dI_d^*}{dt}\right)}{\sqrt{3(1-kU_0^*)^{2+1}}} - \cos\gamma_{ref}\right] - \arctan\left(\frac{\sqrt{3}kU_0^*}{4-3kU_0^*}\right)$$

the three-phase trigger-angle calculation formula is:

$$\alpha_{thr} = \arccos\left[\frac{3X_T^*\left(2I_d^* + T\frac{dI_d^*}{dt}\right)}{2U_L'} - \cos\gamma_{ref}\right]$$

where, k is the impedance ratio, $\gamma_{ref}$ is the setting value of the extinction angle, $X_T^*$ is the per unit value of the short-circuit reactance of the converter, $I_d^*$ is the per unit value of the DC current, and $U_0^*$ is a per unit value of the zero-sequence component amplitude $U_0$, $U_L'$ is the αβ component amplitude, and T is the commutation time of the converter valve in the converter of the HVDC transmission system.

The present disclosure further provides an apparatus for suppressing a first high-voltage direct-current (HVDC) commutation failure under an alternative current (AC) system fault, applied to an HVDC transmission system, and including a first acquisition and calculation module, a second acquisition and calculation module, a comparison and selection module, and a control module, where the first acquisition and calculation module is configured to obtain a three-phase voltage of a converter bus in the HVDC transmission system, and calculate a zero-sequence component amplitude and an αβ component amplitude of the three-phase voltage of the converter bus;

the second acquisition and calculation module is configured to obtain a setting value of an extinction angle of the HVDC transmission system, a per unit value of a short-circuit reactance of a converter, a per unit value of a DC current, a commutation time and an impedance ratio, and calculate a first trigger-angle command for a single-phase fault and a second trigger-angle command for a three-phase fault according to the zero-sequence component amplitude and the αβ component amplitude;

the comparison and selection module is configured to select a smaller one of the first trigger angle command and the second trigger angle command as a trigger-angle command for an extinction-angle controller controlling a converter valve in the converter; and the control module is configured to adjust a trigger angle of the HVDC transmission system by using the trigger-angle command for the extinction-angle controller as an upper limit value for an output of the extinction-angle controller of the HVDC transmission system.

Preferably, the first acquisition and calculation module includes a data acquisition submodule, a first calculation submodule, a second calculation submodule and a third calculation submodule;

the data acquisition submodule is configured to obtain the three-phase voltage of the converter bus in the HVDC transmission system, where the three-phase voltage includes a Phase A voltage $u_A$, a Phase B voltage $u_B$, and a Phase C voltage $u_C$;

the first calculation submodule is configured to derive a zero-sequence component, a α component and a β component by substituting the Phase A voltage $u_A$, the Phase B voltage $u_B$, and the Phase C voltage $u_C$ into a zero-sequence component formula and a Clark transformation formula;

the second calculation submodule is configured to calculate the zero-sequence component amplitude $U_0$ by applying a maximum value holding function on the zero-sequence component; and the third calculation submodule is configured to calculate a pre-αβ component amplitude $U_L$ by applying a commutation voltage formula on the α component and the β component, and calculating the αβ component amplitude $U_L'$ by applying a minimum value holding function on the pre-αβ component amplitude $U_L$, where the zero-sequence component formula is $$u_0 = \left(\frac{u_A + u_B + u_C}{3}\right);$$

the Clark transformation formula is:

$$\begin{bmatrix} u_\alpha \\ u_\beta \end{bmatrix} = \frac{1}{3}\begin{bmatrix} 2 & -1 & -1 \\ 0 & \sqrt{3} & -\sqrt{3} \end{bmatrix}\begin{bmatrix} u_A \\ u_B \\ u_C \end{bmatrix}$$

the maximum value holding function is: $U_0 = \text{MAX\_HOLD}(|u_0|)$;

the commutation voltage formula is: $U_L = \sqrt{3u_\alpha^2 + 3u_\beta^2}$; and the minimum value holding function is: $U_L' = \text{MAX\_HOLD}(|U_L|)$.

Preferably, the second acquisition and calculation module is further configured to substitute the setting value of the extinction angle of the HVDC transmission system, the per unit value of the short-circuit reactance of the converter, the per unit value of the DC current, the commutation time and the impedance ratio, the zero-sequence component magnitude and the αβ component magnitude into a single-phase trigger-angle calculation formula and a three-phase trigger-angle calculation formula to respectively obtain the first trigger-angle command $\alpha_{sig}$ for the single-phase fault and the second trigger-angle command $\alpha_{thr}$ for the three-phase fault, where the single-phase trigger-angle calculation formula is:

$$\alpha_{3y.ord} = \arccos\left[\frac{X_T^*\left(2I_d^* + T\frac{dI_d^*}{dt}\right)}{\sqrt{3(1-kU_0^*)^{2+1}}} - \cos\gamma_{ref}\right] - \arctan\left(\frac{\sqrt{3}kU_0^*}{4-3kU_0^*}\right)$$

the three-phase trigger-angle calculation formula is:

$$\alpha_{thr} = \arccos\left[\frac{3X_T^*\left(2I_d^* + T\frac{dI_d^*}{dt}\right)}{2U_L'} - \cos\gamma_{ref}\right]$$

where, k is the impedance ratio of the HVDC transmission system, $\gamma_{ref}$ is the setting value of the extinction angle, $X_T^*$ is the per unit value of the short-circuit reactance of the converter, $I_d^*$ is the per unit value of the DC current, and $U_0^*$ is a per unit value of the zero-sequence component amplitude $U_0$, $U_L'$ is the αβ component amplitude, and T is the commutation time of the converter valve in the converter of the HVDC transmission system.

The present disclosure further provides a computer readable storage medium, storing computer instructions, where the computer instructions, when being executed by a computer, cause the computer to perform the above method for suppressing a first HVDC commutation failure under an AC system fault.

The present disclosure further provides a device for suppressing a first high-voltage direct-current (HVDC) commutation failure under an alternative current (AC) system fault, including a processor and a memory, where
the memory is configured to store a program and transmit the program to the processor, and
the processor is configured to execute the program to perform the method for suppressing a first HVDC commutation failure under an AC system fault.

It can be seen that the above technical solutions have the following advantageous. With the method, apparatus and device for suppressing a first HVDC commutation failure under an AC system fault, by obtaining a three-phase voltage of a converter bus in the HVDC transmission system, calculating a zero-sequence component amplitude and an αβ component amplitude of the three-phase voltage, then calculating a first trigger-angle command for a single-phase fault and a second trigger-angle command for a three-phase fault according to the zero-sequence component amplitude and the αβ component amplitude, then comparing the first trigger angle command and the second trigger angle command to select a smaller one as a trigger-angle command for an extinction-angle controller controlling a converter valve in the converter, and using the trigger-angle command for the extinction-angle controller as an upper limit value for a trigger-angle command of the existing trigger-angle controller of the HVDC transmission system, the trigger angle command for the extinction angle of the converter valve in the HVDC transmission system can be rapidly adjusted. Compared with the conventional technology, the method for suppressing a first HVDC commutation failure under an AC system fault provided by the present disclose can improve the response speed of the trigger angle command at the inverter side under AC system faults, thereby effectively reducing probability of the first commutation failure of the converter under AC system faults, and thus solving the technical problem of commutation failure of the converter in the existing HVDC transmission system under AC system faults.

BRIEF DESCRIPTION OF THE DRAWINGS

In order to more clearly illustrate the technical solutions in the embodiments of the present disclosure or the prior art, the following will briefly introduce the drawings that need to be used in the description of the embodiments or the prior art. Apparently, the accompanying drawings in the following description are only some embodiments of the present disclosure. For those skilled in the art, other drawings can also be obtained according to these drawings without creative efforts.

FIG. 1 is a flowchart of a method for suppressing a first HVDC commutation failure under an AC system fault according to an embodiment of the present disclosure.

DETAILED DESCRIPTION

In order to make the purpose, features and advantages of the present disclosure more clear and understandable, the technical solutions in the embodiments of the present disclosure will be clearly and completely described below in conjunction with the accompanying drawings of the embodiments of the present disclosure. Apparently, the following described embodiments are only some, but not all, of the embodiments of the present disclosure. Based on the embodiments of the present disclosure, all other embodiments obtained by those of ordinary skill in the art without creative efforts fall within the scope of protection.

The embodiments of the present disclosure provide a method, an apparatus and a device for suppressing a first HVDC commutation failure under an AC system fault, which are applied to an HVDC transmission system and used to solve the problem of commutation failure of a converter under an AC system fault in existing HVDC transmission systems.

First Embodiment

Figure 2:
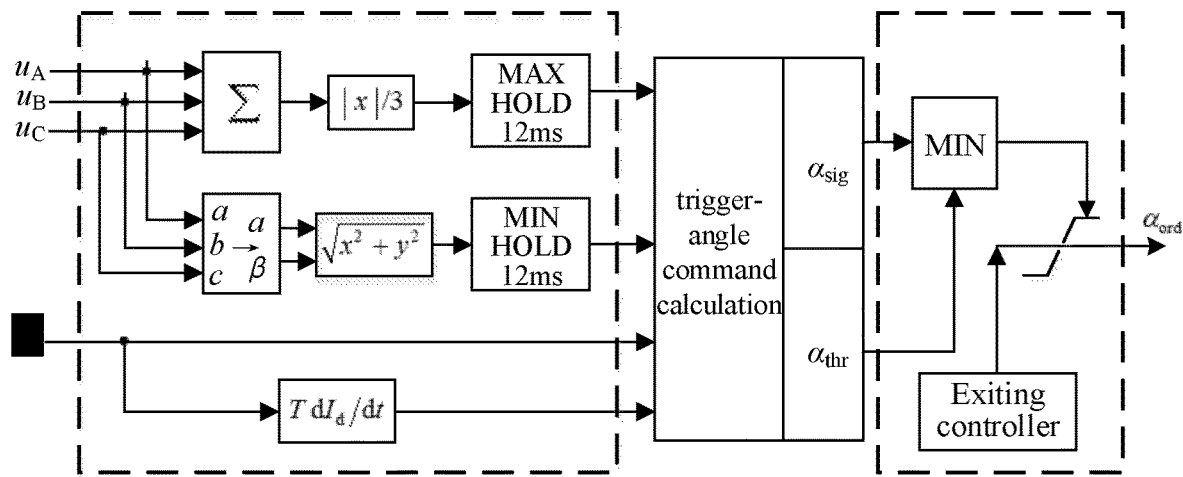
FIG. 2 is a framework diagram of a method for suppressing a first HVDC commutation failure under an AC system fault according to an embodiment of the present disclosure.

FIG. 1 is a flowchart of a method for suppressing a first HVDC commutation failure under an AC system fault according to an embodiment of the present disclosure, and FIG. 2 is a framework diagram of a method for suppressing a first HVDC commutation failure under an AC system fault according to an embodiment of the present disclosure.

As shown in FIGS. 1 and 2, according to an embodiment of the present disclosure, a method for suppressing a first HVDC commutation failure under an AC system fault is provided, which is applied to an HVDC transmission system, and includes the following steps S10 to S40.

S10. Obtain a three-phase voltage of a converter bus in the HVDC transmission system, and calculate a zero-sequence component amplitude and an $\alpha\beta$ component amplitude of the three-phase voltage of the converter bus.

S20. Obtain a setting value of an extinction angle of the HVDC transmission system, a per unit value of a short-circuit reactance of a converter, a per unit value of a DC current, a commutation time and an impedance ratio, and calculate a first trigger-angle command for a single-phase fault and a second trigger-angle command for a three-phase fault according to the zero-sequence component amplitude and the $\alpha\beta$ component amplitude.

S30. Select a smaller one of the first trigger angle command and the second trigger angle command as a trigger-angle command for an extinction-angle controller controlling a converter valve in the converter.

S40. Adjust a trigger angle of the HVDC transmission system by using the trigger-angle command for the extinction-angle controller as an upper limit value for an output of the extinction-angle controller of the HVDC transmission system.

In the embodiment, the method for suppressing a first HVDC commutation failure under an AC system fault mainly includes obtaining a three-phase voltage of a converter bus in the HVDC transmission system, calculating a zero-sequence component amplitude and an $\alpha\beta$ component amplitude from the three-phase voltage, then obtaining a setting value of an extinction angle of the HVDC transmission system, a per unit value of a short-circuit reactance of a converter, a per unit value of a DC current, a commutation time and an impedance ratio, and calculating a first trigger-angle command for the HVDC transmission system under a single-phase fault and a second trigger-angle command for the HVDC transmission system under a three-phase fault, then comparing the first trigger angle command and the second trigger angle command to select a smaller one as a trigger-angle command for an extinction-angle controller controlling a converter valve in the converter, and using the trigger-angle command for the extinction-angle controller as an upper limit value for an output command of the existing trigger-angle controller of the HVDC transmission system, so as to rapidly adjust a trigger-angle command for the extinction angle of the converter valve in the HVDC transmission system.

With the method for suppressing a first HVDC commutation failure under an AC system fault provided by the present disclose, by obtaining a three-phase voltage of a converter bus in the HVDC transmission system, calculating a zero-sequence component amplitude and an $\alpha\beta$ component amplitude of the three-phase voltage, then calculating a first trigger-angle command for a single-phase fault and a second trigger-angle command for a three-phase fault according to the zero-sequence component amplitude and the $\alpha\beta$ component amplitude, then comparing the first trigger angle command and the second trigger angle command to select a smaller one as a trigger-angle command for an extinction-angle controller controlling a converter valve in the converter, and using the trigger-angle command for the extinction-angle controller as an upper limit value for a trigger-angle command of the existing trigger-angle controller of the HVDC transmission system, the trigger angle command for the extinction angle of the converter valve in the HVDC transmission system can be rapidly adjusted. Compared with the conventional technology, the method for suppressing a first HVDC commutation failure under an AC system fault provided by the present disclose can improve the response speed of the trigger angle command at the inverter side under AC system faults, thereby effectively reducing probability of the first commutation failure of the converter under AC system faults, and thus solving the technical problem of commutation failure of the converter in the existing HVDC transmission system under AC system faults.

In an embodiment of the present disclosure, the step S10 of obtaining a three-phase voltage of a converter bus in the HVDC transmission system, and calculating a zero-sequence component amplitude and an $\alpha\beta$ component amplitude of the three-phase voltage of the converter bus includes:

obtaining the three-phase voltage of the converter bus in the HVDC transmission system, where the three-phase voltage includes a Phase A voltage $u_A$, a Phase B voltage $u_B$, and a Phase C voltage $u_C$;

deriving a zero-sequence component, a $\alpha$ component and a $\beta$ component by substituting the Phase A voltage $u_A$, the Phase B voltage $u_B$, and the Phase C voltage $u_C$ into a zero-sequence component formula and a Clark transformation formula;

calculating the zero-sequence component amplitude $U_0$ by applying a maximum value holding function on the zero-sequence component; and calculating a pre-$\alpha\beta$ component amplitude $U_L$ by applying a commutation voltage formula on the $\alpha$ component and the $\beta$ component, and calculating the $\alpha\beta$ component amplitude $U_L'$ by applying a minimum value holding function on the pre-$\alpha\beta$ component amplitude $U_L$.

In an embodiment, the zero-sequence component formula is $$u_0 = \left(\frac{u_A + u_B + u_C}{3}\right);$$

the Clark transformation formula is:

$$\begin{bmatrix} u_\alpha \\ u_\beta \end{bmatrix} = \frac{1}{3}\begin{bmatrix} 2 & -1 & -1 \\ 0 & \sqrt{3} & -\sqrt{3} \end{bmatrix}\begin{bmatrix} u_A \\ u_B \\ u_C \end{bmatrix};$$

the maximum value holding function is: $U_0 = \text{MAX\_HOLD}(|u_0|)$; the commutation voltage formula is: $U_L = \sqrt{3u_\alpha^2 + 3u_\beta^2}$; and the minimum value holding function is: $U_L' = \text{MAX\_HOLD}(|U_L|)$.

It should be noted that, in an embodiment, the required holding time in the process of calculating the zero-sequence component amplitude $U_0$ and the $\alpha\beta$ component amplitude $U_L'$ using the maximum value holding function formula and the minimum value holding function formula is 12 ms.

In an embodiment of the present disclosure, the method for suppressing a first HVDC commutation failure under an AC system fault further includes: substituting the setting value of the extinction angle of the HVDC transmission system, the per unit value of the short-circuit reactance of the converter, the per unit value of the DC current, the commutation time and the impedance ratio, the zero-sequence component magnitude and the $\alpha\beta$ component magnitude into a single-phase trigger-angle calculation formula and a three-phase trigger-angle calculation formula to respectively obtain the first trigger-angle command $\alpha_{sig}$ for the single-phase fault and the second trigger-angle command $\alpha_{thr}$ for the three-phase fault.

The single-phase trigger-angle calculation formula is:

$$\alpha_{3y.ord} = \arccos\left[\frac{X_T^*\left(2I_d^* + T\frac{dI_d^*}{dt}\right)}{\sqrt{3(1-kU_0^*)^{2+1}}} - \cos\gamma_{ref}\right] - \arctan\left(\frac{\sqrt{3}kU_0^*}{4-3kU_0^*}\right)$$

The three-phase trigger-angle calculation formula is:

$$\alpha_{thr} = \arccos\left[\frac{3X_T^*\left(2I_d^* + T\frac{dI_d^*}{dt}\right)}{2U_L'} - \cos\gamma_{ref}\right]$$

In the formulas, k is the impedance ratio of the HVDC transmission system, $\gamma_{ref}$ is the setting value of the extinction angle, $X_T^*$ is the per unit value of the short-circuit reactance of the converter, $I_d^*$ is the per unit value of the DC current, and $U_0^*$ is a per unit value of the zero-sequence component amplitude $U_0$, $U_L'$ is the $\alpha\beta$ component amplitude, and T is the commutation time of the converter valve in the converter of the HVDC transmission system.

It should be noted that, $U_0^*$, which is the per unit value of the zero-sequence component amplitude $U_0$, refers to the ratio of the zero-sequence component amplitude $U_0$ to the phase voltage of the converter bus of the HVDC transmission system.

In this embodiment, the converter in the HVDC transmission system is described by using a 12-pulse converter as an example. The HVDC transmission system adopts the wiring mode of YNy0 and YNd1. A grounded short-circuit fault in phase A is described as an example of a single-phase fault in the HVDC transmission system. In the HVDC transmission system in the wiring mode of YNy0, the amplitudes of commutation voltages on the y side of the HVDC transmission system can be calculated by the symmetric component method as shown in expression (1):

$$\begin{cases} U_{ACy} = \frac{3}{2}\frac{Z_0 - 3Z_f}{2Z_1 + Z_0 + 3Z_f} - j\frac{\sqrt{3}}{2} \\ U_{BAy} = -\frac{3}{2}\frac{Z_0 - 3Z_f}{2Z_1 + Z_0 + 3Z_f} - j\frac{\sqrt{3}}{2} \\ U_{CBy} = j\sqrt{3} \end{cases}$$

In the HVDC transmission system in the wiring mode of YNd1, the amplitudes of commutation voltages on the d side of the HVDC transmission system can be calculated by expression (2):

$$\begin{cases} U_{ACd} = \frac{\sqrt{3}}{2}\frac{Z_0 + 3Z_f}{2Z_1 + Z_0 + 3Z_f} - j\frac{3}{2} \\ U_{BAd} = -\sqrt{3}\frac{(Z_0 + 3Z_f)}{2Z_1 + Z_0 + 3Z_f} \\ U_{CBd} = \frac{\sqrt{3}}{2}\frac{Z_0 + 3Z_f}{2Z_1 + Z_0 + 3Z_f} + j\frac{3}{2} \end{cases}$$

In the above expressions, $Z_1$, $Z_2$, and $Z_0$ are respectively the positive sequence impedance, negative sequence impedance, and zero sequence impedance of the HVDC transmission system, $Z_f$ is the fault transition impedance, $U_{ACy}$ is the amplitude of a commutation voltage between Phase A and Phase C in the wiring mode of YNy0, $U_{BAy}$ is the amplitude of a commutation voltage between Phase B and Phase A in the wiring mode of YNy0, $U_{CBy}$ is the amplitude of a commutation voltage between Phase C and Phase B in the wiring mode of YNy0, j is the imaginary unit, and $U_{ACd}$ is the amplitude of a commutation voltage between Phase A and Phase C in the wiring mode of YNy1, $U_{ACd}$ is the amplitude of a commutation voltage between Phase A and Phase C in the wiring mode of YNy1, and $U_{CBd}$ is the amplitude of a commutation voltage between Phase C and Phase B in the wiring mode of YNy1. Generally, the positive sequence impedance and negative sequence impedance in a HVDC transmission system are equal to each other. Based on the above expressions (1) and (2), expression (3) is obtained:

$$\frac{Z_0 + 3Z_f}{2Z_1 + Z_0 + 3Z_f} = x + jy$$

where, x is the real part and y is the imaginary part.

Since the positive sequence impedance, negative sequence impedance and zero sequence impedance in the HVDC transmission system are basically inductive, while the faulty grounding impedance is mostly resistive, $Z_0 + 3Z_f = a + jb$, $2Z_1 = jc$ are obtained, where a, b, and c are all greater than 0. Substituting them into expression (3), the following constraint relationship (4) of value ranges of x and y can be obtained:

$$\begin{cases} x \in (0, 1) \\ y \in \left(-\frac{1}{2}, 0\right) \\ x^2 + y^2 \in (0, 1) \end{cases}$$

It can be seen, from the expressions (1), (2) and (4), that among all commutation voltages, the drops and phase offsets (in the leading direction) of the $U_{ACy}$ and $U_{ACd}$ are not the most serious, and the amplitude and phase of $U_{CBy}$ remain unchanged before and after the fault, leading to less possibility of commutation failure of corresponding converter valves. For the amplitudes of commutation voltages $U_{BAy}$, $U_{BAd}$, and $U_{CBd}$, their amplitude drops and phase offsets are determined by the impedance type and severity of the fault. Therefore, when analyzing a single-phase fault, only the relationship between the amplitude drops and phase offsets of commutation voltages $U_{BAy}$, $U_{BAd}$, and $U_{CBd}$ needs to be considered.

In an embodiment, two identity transformations are performed on expression (3) to obtain expression (5) as follows:

$$(1-x) - jy = \frac{2Z_1}{2Z_1 + Z_0 + 3Z_f}$$

$$(1+x) + jy = 2\frac{Z_1 + Z_0 + 3Z_f}{2Z_1 + Z_0 + 3Z_f}$$

Based on the above expression (5), expression (6) is obtained as follows:

$$\frac{2|Z_1|}{|2Z_1 + Z_0 + 3Z_f|} = u$$

$$\frac{2|Z_1 + Z_0 + 3Z_f|}{|2Z_1 + Z_0 + 3Z_f|} = v - u$$

Expression (6) is substituted into expression (5) to obtain expression (7):

$$(1-x)^2 + y^2 = u^2, (1+x)^2 + y^2 = (u-v)^2$$

Based on expression (7), x and y are solved as:

$$x = \frac{v(v-2u)}{4}$$

$$y = -\sqrt{u^2 - \left[1 - \frac{v(v-2u)}{4}\right]^2}$$

Based on expression (3), the obtained x and y are substituted into expressions (1) and (2) to obtain the expressions in which the amplitudes of the commutation voltages $U_{BAy}$, $U_{BAd}$, and $U_{CBd}$ are each related to u and v, and obtain u=2U_−, v=2(U_++U_−), where U_+ and U_− are respectively the positive sequence component and negative sequence component of the three-phase voltage of the converter bus. In expressions (1) and (2), if $Z_0 + 3Z_f = a+jb$, $2Z_1 = jc$, then expression (6) is updated to expression (8), which is:

$$U_+ + U_- = \frac{|Z_1 + Z_0 + 3Z_f| + |Z_1|}{|2Z_1 + Z_0 + 3Z_f|} - \frac{\sqrt{a^2 + (b+c)^2} + c}{\sqrt{a^2 + (b+2c)^2}}$$

According to expression (8), when the transition impedance is purely inductive (a=0), $U_+ + U_-$ reaches the minimum value 1, and when and only when b=0, $a^2 = 8c^2$, $U_+ + U_-$ reaches the maximum Value 1.15. Therefore, $U_+ + U_-$ is approximated to 1. In the HVDC transmission line system, the faults at the converter bus are mostly inductive faults. When an inductive fault occurs, $U_+ + U_-$ is 1, and when a resistive-inductive fault occurs, $U_+ + U_-$ reaching the maximum value is still not far from 1. Therefore, the calculation error caused by this approximation is small. When $U_+ + U_-$ is approximated to 1, under the resistive-inductive fault, when the amplitude and phase offset of each commutation voltage are substituted into the trigger angle calculation formula, the calculation results tend to be conservative, and the calculated trigger angle have no adverse effects on avoiding commutation failure.

In an embodiment of the present disclosure, after approximating $U_+ + U_-$ to 1, it can be known from expression (8) that v=2. According to the Clark transformation formula, the relationship expression (9) between the negative sequence component amplitude and the zero-sequence component amplitude of the voltage at the converter bus is:

$$u = 2U_- = \frac{|Z_1|}{|Z_0|}U_0 = kU_0$$

The expressions of $U_{BAy}$, $U_{BAd}$, and $U_{CBd}$ are updated by using v=2 and expression (9), to obtain expression (10):

$$U'_{BAy} = \sqrt{\frac{9}{4}(1-kU_0)^2 + \frac{3}{4}}$$

$$U'_{BAd} = \sqrt{3}(1-kU_0)$$

$$U'_{CBd} = \sqrt{\frac{3}{4}(1-kU_0)^2 + \frac{9}{4}}$$

In the same way, the phase offset expression (11) corresponding to $U_{BAy}$, $U_{BAd}$, and $U_{CBd}$ is:

$$\Delta\phi_{BAy} = \arctan\left(\frac{\sqrt{3}kU_0}{4 - 3kU_0}\right)$$

$$\Delta\phi_{BAd} = 0$$

$$\Delta\phi_{CBd} = \arctan\left(\frac{\sqrt{3}kU_0}{4 - kU_0}\right)$$

In the formula, $\Delta\phi_{BAy}$ is the phase offset between the Phase B and Phase A in the wiring mode of YNy0, $\Delta\phi_{BAd}$ is the phase offset between the Phase B and Phase A in the wiring mode of YNd1, and $\Delta\phi_{CBd}$ is the phase offset between the Phase C and Phase B in the wiring mode of YNd1.

It can be seen from the above that the amplitude of commutation voltage $U_{BAy}$ corresponds to the highest risk of commutation failure in the HVDC transmission system under a single-phase fault in phase A.

Figure 3:
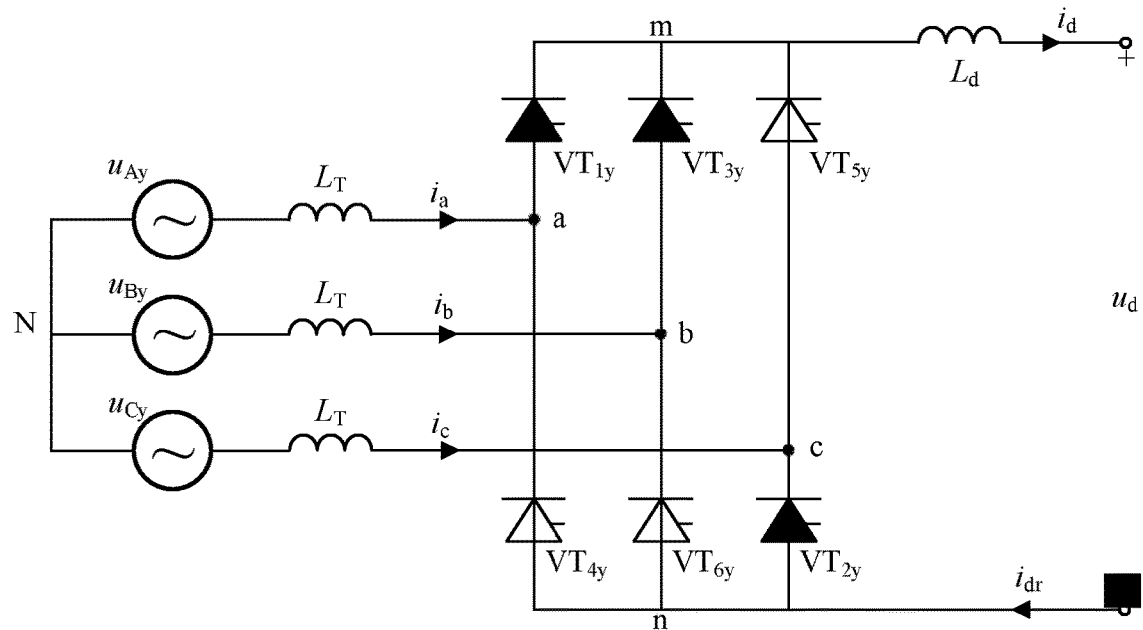
FIG. 3 is a schematic diagram of the wiring principle of a 6-pulse converter used in a method for suppressing a first HVDC commutation failure under an AC system fault according to an embodiment of the present disclosure.

FIG. 3 is a schematic diagram of the wiring principle of a 6-pulse converter used in a method for suppressing a first HVDC commutation failure under an AC system fault according to an embodiment of the present disclosure.

As shown in FIG. 3, in the embodiment of the present disclosure, taking the 6-pulse inverter in the wiring mode of YNd1 as an example, it is assumed that the conduction sequence of the valves is $VT_{1y} \to VT_{2y} \to VT_{3y} \to VT_{4y} \to VT_{5y} \to VT_{6y}$. Taking the process of commutation from $VT_{1y}$ to $VT_{3y}$ as an example, the KVL equation of the corresponding commutation loop is shown in the following Equation (12):

$$u_{BAy} = L_T \frac{di_b}{dt} - L_T \frac{di_a}{dt}$$

In the formula, $L_T$ is the commutation inductance, $i_b$ and $i_a$ are respectively the currents passing through windings of the phase B and phase A of the converter, $u_{BAy} = u_{By} - u_{Ay}$, $u_{BAy}$ is the commutation voltage corresponding to $VT_{3y}$. Assuming that the trigger time and commutation end time of valve 3 are $t_\alpha$ and $t_{\alpha+\mu}$ respectively, by integrating $uB_{Ay}$ in the interval $(t_\alpha, t_{\alpha+\mu})$, the following expression (13) can be obtained as:

$$\int_{t_\alpha}^{t_{\alpha+\mu}} u_{BAy} dt = L_T[i_a(t_\alpha) - i_a(t_{\alpha+\mu}) - i_b(t_\alpha) + i_b(t_{\alpha+\mu})]$$

At the start time and end time of the commutation, $i_b(t_\alpha)=i_a(t_{\alpha+\mu})=0$, which is substituted into expression (13) to organize expression (13) into the following expression (14) under the assumption that $uB_{Ay}$ is a standard sine wave:

$$U_{BAy}(\cos \alpha_{3y}+\cos \gamma_{1y})=X_T[i_a(t_\alpha)+i_b(t_{\alpha+\mu})]$$

In the equation, $U_{BAy}$ is the amplitude of commutation voltage $u_{BAy}$, $\alpha_{3y}$ is the trigger angle of $VT_{3y}$, $\gamma_{1y}$ is the extinction angle of $VT_{1y}$, and $X_T$ is the commutation reactance. From expression (14), the relationship between the trigger angle and the extinction angle of each converter valve is:

$$\alpha_{iy} = \arccos\left\{\frac{X_T[i_a(t_\alpha)+i_b(t_{\alpha+\mu})]}{U_{iy}} - \cos \gamma_{(i-2)y}\right\}$$

In the equation, $\alpha_{iy}$ is the triggering angle of converter valve $VT_{iy}$, $\gamma_{(i-2)y}$ is the extinction angle of converter valve $VT_{(i-2))y}$, $U_{iy}$ is the amplitude (actual value on the valve) of the commutation voltage corresponding to $VT_{iy}$ (i=1, 2, 3, 4, 5, 6), and their relationship with each line voltage is shown in Table 1.

TABLE 1

| | amplitudes of the commutation voltages corresponding to converter valves | | | | | |
|---|---|---|---|---|---|---|
| $VT_{iy}$ | $VT_{1y}$ | $VT_{2y}$ | $VT_{3y}$ | $VT_{4y}$ | $VT_{5y}$ | $VT_{6y}$ |
| Amplitudes of commutation voltages | $U_{1y}$ $U_{ACy}$ | $U_{2y}$ $U_{BCy}$ | $U_{3y}$ $U_{BAy}$ | $U_{4y}$ $U_{CAy}$ | $U_{5y}$ $U_{CBy}$ | $U_{6y}$ $U_{ABy}$ |

It can be seen from Table 1 that in the HVDC transmission system, the commutation voltages of the upper and lower arms of the same converter bridge are in reverse phases, so that only the amplitudes and phase offsets of six commutation voltages on the y side and the d side need to be considered.

From the relationship between the trigger angle and the extinction angle of each converter valve, the trigger angle demand $\alpha_{\gamma,iy}$ of each converter valve in relation to the setting value of the extinction angle can be obtained as:

$$\alpha_{\gamma,iy} = \arccos\left\{\frac{X_T[i_a(t_\alpha)+i_b(t_{\alpha+\mu})]}{U_{iy}} - \cos \gamma_{ref}\right\}$$

In the formula, $\gamma_{ref}$ is the setting value of the extinction angle. From the above solution of $\alpha_{\gamma,iy}$, it can be seen that the trigger angle demand of each converter valve is related to the DC current $i_d(t_\alpha)$ at the start of commutation and the DC current $i_d(t_{\alpha+\mu})$ at the end of commutation. However, before the actual triggering, the converter triggering control system has not yet issued a triggering pulse for the next converter valve, so that the commutation process has not yet started, and the DC current at the end of commutation cannot be known. In order to take into account the influence of the DC current during the commutation, considering that the commutation duration is usually short, it is assumed that the DC current changes during the commutation at the current change rate at the start of the commutation. The $i_d(t_\alpha)$ is simplified as $I_d$, and the formula for solving $\alpha_{\gamma,iy}$ is updated to:

$$\alpha_{\gamma,iy} = \arccos\left\{\frac{X_T\left[2I_d + T\left(\frac{dI_d}{dt}\right)\right]}{U_{iy}} - \cos \gamma_{ref}\right\}$$

In the formula, T is the commutation time of the converter valve. Under normal operation conditions, the commutation time of the converter valve is about 1.4 ms (corresponding to an electrical angle of 24°). Considering that the commutation angle may increase during a fault, T is taken as 2 ms here. After a single-phase fault occurs in the HVDC transmission system, the amplitude of each commutation voltage drops, and the phase of each commutation voltage may also jump. Since the phase-locked loop needs to take a period of time to lock the phase of each commutation voltage, the phase error caused by the phase jump will cause deviation of the actual trigger angle of the converter valve from a command value.

Taking into account the actual trigger angle offset caused by the phase jump, the formula (15) for solving the trigger angle command for each converter valve should be:

$$\alpha_{j\xi,ord} = \arccos\left[\frac{X_T\left(2I_d + T\frac{dI_d}{dt}\right)}{U_{j\xi}} - \cos \gamma_{ref}\right] - \Delta\phi_{j\xi}$$

In the formula, j=1, 3, 5 represents the valve number, x=y, d represents the connection mode of the transformer valves, and $Df_{jx}$ is the phase offset of the commutation voltage of each converter valve. In the equal-phase-interval triggering mode, only one trigger angle command is finally sent to the trigger control system to generate a trigger pulse. Therefore, in order to ensure that each converter valve has sufficient commutation margin, only the converter valve having the highest probability of commutation failure needs to be considered, that is, the final trigger angle command should be the least value among the six trigger angle commands. Among all commutation voltages, the drops and phase offsets (in the leading direction) of the $U_{ACy}$ and $U_{ACd}$ are not the greatest, and the amplitude and phase of $U_{CBy}$ remain unchanged before and after the fault, so that the trigger angle commands for the corresponding valves cannot be the least one (that is, the risk of commutation failure is not the greatest) and does not need to be considered. In addition, since $U_++U_-$ is approximated to 1, it can be seen, from the solution formula of the trigger angle command of the converter valve, that after this approximation, the obtained trigger angle command of each converter valve is slightly smaller than original ones. Since under the same fault, a smaller trigger angle command will make the extinction angle of the converter valve slightly larger, this approximation will not have an adverse impact on avoiding commutation failure. According to expression (11), among the commutation voltages $U_{BAy}$, $U_{BAd}$ and $U_{CBd}$, the amplitude drop and phase offset of $U_{CBd}$ are always smaller than those of $U_{BAd}$, that is, the risk of commutation failure of the converter valve corresponding to the commutation voltage $u_{Cbd}$ is not the greatest. Therefore, only the relationships between the trigger angle command and the commutation voltages $u_{Bay}$ and $U_{BAd}$ will be discussed in the follows.

In the embodiment of the present disclosure, $X_T^*$ is the per unit value of short-circuit reactance of the converter, and formula (15) is updated to obtain the following formula (16):

$$\alpha_{j\xi.ord} = \arccos\left[\frac{X_T^*\left(2I_d^* + T\frac{dI_d^*}{dt}\right)}{\frac{2U_{j\xi}^*}{\sqrt{3}}} - \cos\gamma_{ref}\right] - \Delta\phi_{j\xi}$$

In the formula, $I_d^*$ is the per unit value of DC current, which is 1.0 p.u. in a steady state. $U_{jx}^*$ is the per unit value of the commutation voltage, and is $\sqrt{3}$p.u. in the steady state. Substituting the amplitude and phase offset of the commutation voltages $u_{BAy}$ and $U_{BAd}$ into the calculation formula (17) of the single-phase trigger angle, the trigger angle commands of the corresponding converter valves are obtained as follows:

$$\begin{cases} \alpha_{3y.ord} = \arccos\left[\frac{X_T^*\left(2I_d^* + T\frac{dI_d^*}{dt}\right)}{\sqrt{2(1-kU_0^*)^2+1}} - \cos\gamma_{ref}\right] \\ \qquad -\arctan\left(\frac{\sqrt{3}k\,U_0^*}{4-3kU_0^*}\right) \\ \alpha_{3y.ord} = \arccos\left[\frac{X_T^*\left(2I_d^* + T\frac{dI_d^*}{dt}\right)}{2(1-kU_0^*)} - \cos\gamma_{ref}\right] \end{cases}$$

In HVDC engineering, the setting value $\gamma_{ref}$ of the extinction angle is generally between 15° and 18°, and the commutation reactance percentage is generally between 15% and 18%. Here, taking $\gamma_{ref}=17°$ as an example and comparing the $\alpha_{3y.ord}$ with $a_{3d.ord}$, it can be seen that the value of $a_{3y.ord}$ is always smaller than $\alpha_{3d.ord}$ in the inverting state (that is, the trigger angle command is greater than 90°). Therefore, the converter valve having the highest probability of commutation failure is VT3y, that is, $\alpha_{3y.ord}$ should final be selected as the trigger angle command $\alpha_{sig}$ under a single-phase fault.

In an embodiment of the present disclosure, if a three-phase short-circuit fault occurs at the converter bus in the HVDC transmission system, taking the commutation voltage $u_{ACy}$ as an example, its amplitude $\dot{U}_{ACy0}$ and phase angle after the fault occurs can be expressed by formula (18) as follows:

$$\dot{U}_{Acy} = \frac{Z_f}{Z_{eq}+Z_f}\dot{U}_{ACy0} = \frac{\sqrt{3}}{\sqrt{m^2+2m\cos\varphi_\Delta+1}}\angle\left(\theta_0 - \text{arccot}\frac{1+m\cos\varphi_\Delta}{m\sin\varphi_\Delta}\right)$$

In the formula, $\dot{U}_{ACy0}$ is the voltage amplitude of the converter bus before the fault, $\theta Z_0$ is the phase angle of $\dot{U}_{ACy0}$, $Z_{eq}$ is the equivalent impedance of the AC system before the fault. $m=|Z_{eq}/Z_f|$; $\varphi_\Delta=\varphi_{eq}-\varphi_f$ where $\varphi_{eq}$ and $\varphi_f$ are respectively the arguments of $Z_{eq}$ and $Z_f$. It can be known from formula (18) that the amplitude and phase offset of the commutation voltage during the fault are both related to the faulty grounding impedance $Z_f$. If still having $j_{eq}=90°$, when $Z_f$ is resistive and inductive, the phase change amount of the commutation voltage after the fault occurs is Dq<0, that is, the phase of $\dot{U}_{ACy0}$ under the fault lags behind that before the fault. Especially, when $Z_f$ is purely inductive, the phase of the AC bus voltage during a fault is equal to that before the fault. In addition, the more serious the fault is, the greater the amplitude drop and phase offset of the commutation voltage will be. Therefore, for a three-phase fault in a HVDC transmission system, when a resistive-inductive fault causes the lag in phase of each commutation voltage, the actual trigger angle of each converter valve will be smaller than the trigger angle command, which will not result in a decrease of the extinction angle. That is, when $Z_f$ is purely inductive, the commutation voltage phase offset is 0. In this case, the calculation formula of a three-phase trigger angle is:

$$\alpha_{thr} = \arccos\left[\frac{3X_T^*\left(2I_d^* + T\frac{dI_d^*}{dt}\right)}{2U_L'} - \cos\gamma_{ref}\right]$$

Figure 4:
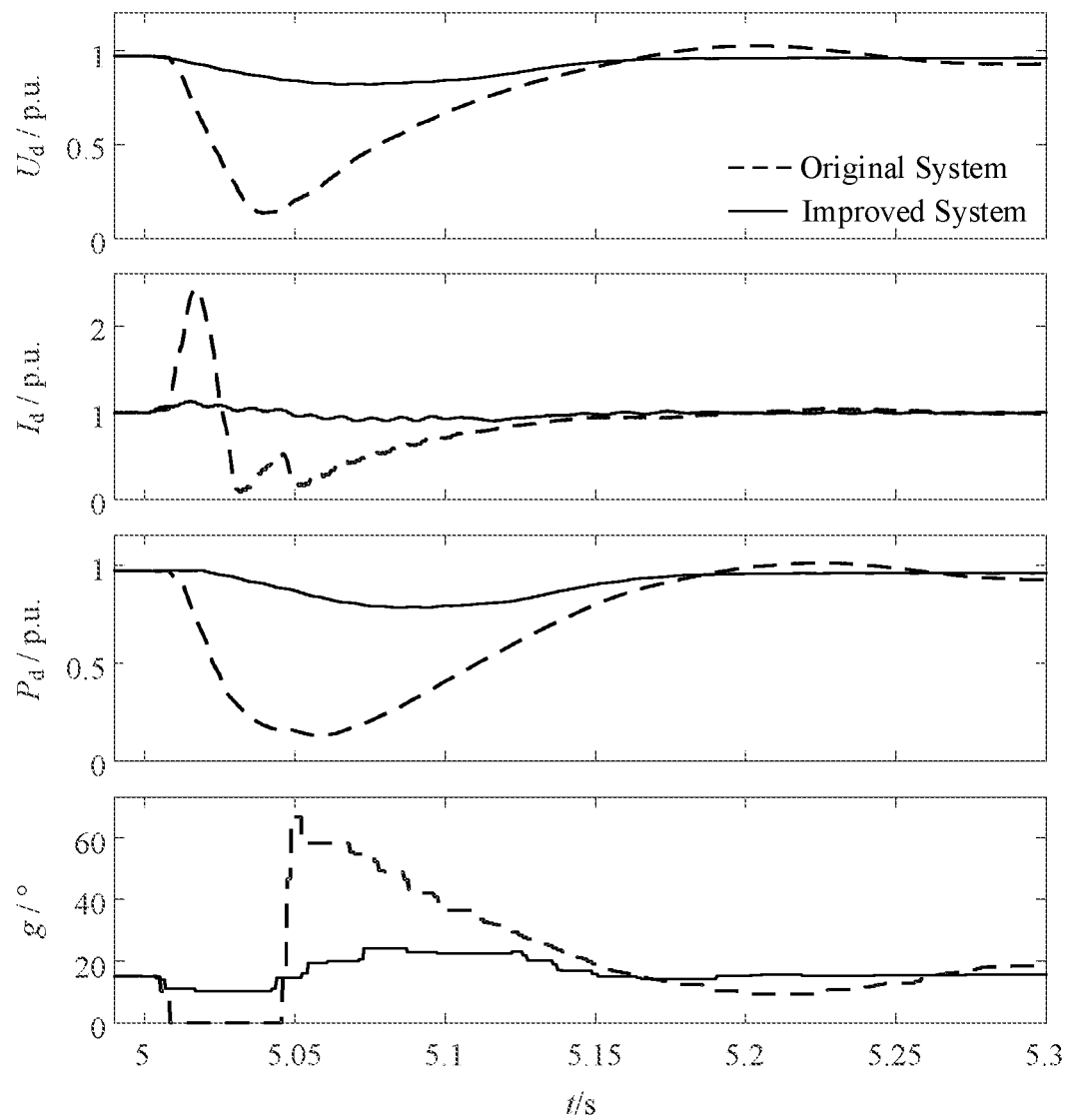
FIG. 4 shows schematic waveform diagrams of the DC voltage, current, power and extinction angle of a transmission system under a single-phase fault, before and after improvement by a method for suppressing a first HVDC commutation failure under an AC system fault according to an embodiment of the present disclosure.
Figure 5:
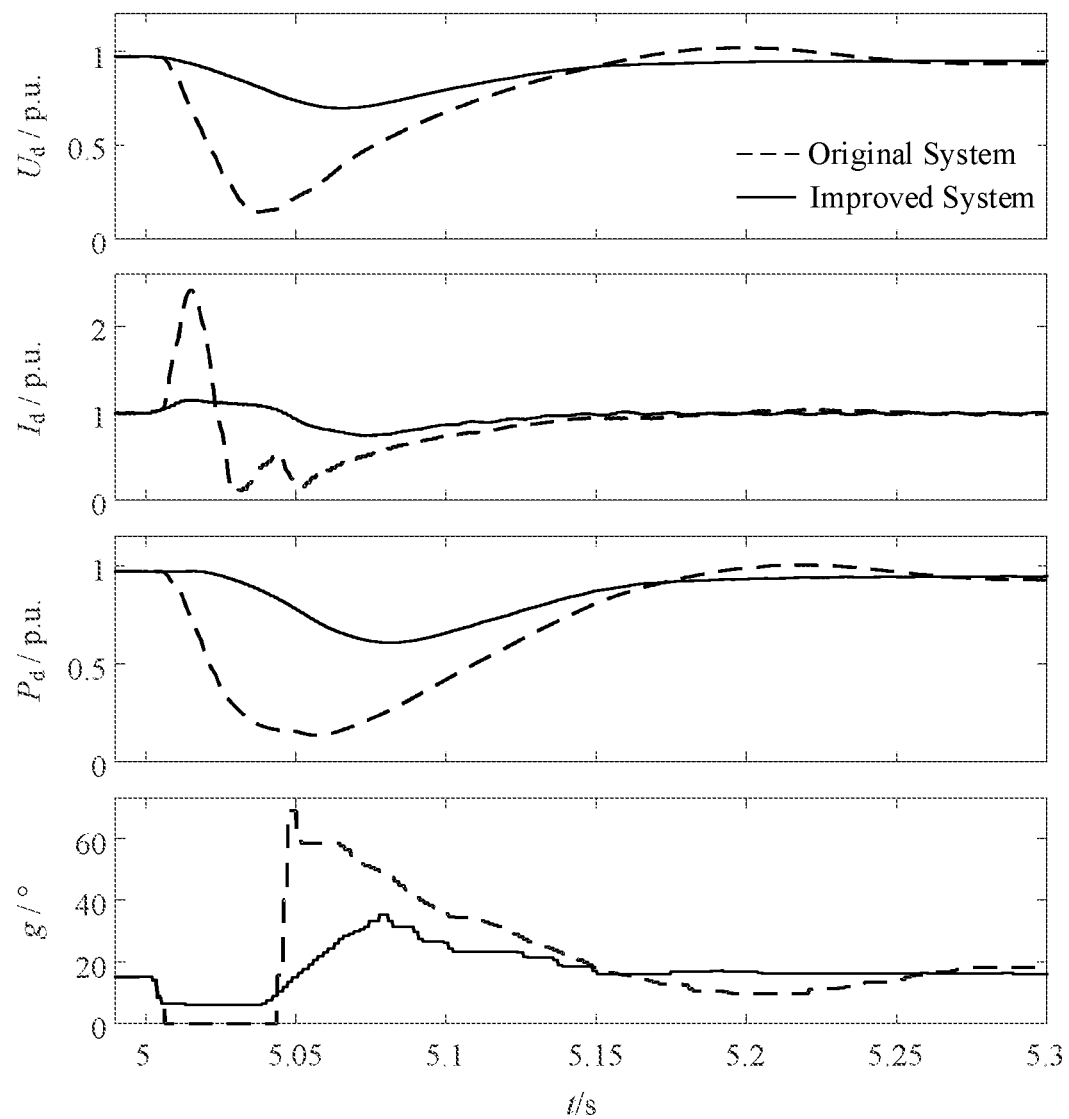
FIG. 5 shows schematic waveform diagrams of the DC voltage, current, power and extinction angle of a transmission system under a three-phase fault, before and after improvement by a method for suppressing a first HVDC commutation failure under an AC system fault according to an embodiment of the present disclosure.
Figure 6:
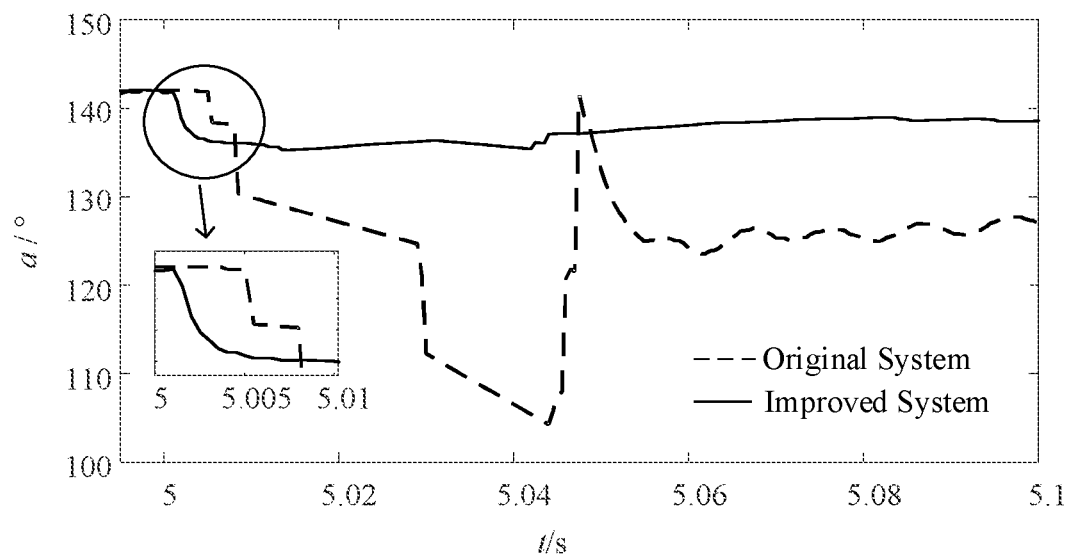
FIG. 6 shows a schematic waveform diagram of a trigger-angle command of an inverter side of a transmission system under a single-phase fault, before and after improvement by a method for suppressing a first HVDC commutation failure under an AC system fault according to an embodiment of the present disclosure.
Figure 7:
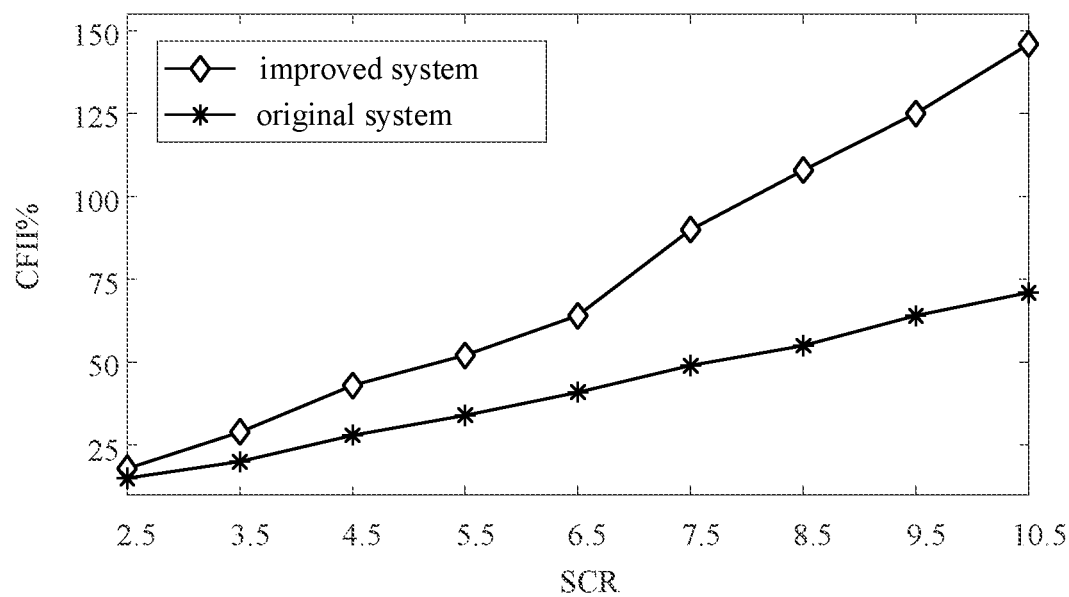
FIG. 7 is a schematic diagram illustrating the comparison of commutation failure immunity performance of the system under a three-phase fault before and after improvement by a method for suppressing a first HVDC commutation failure under an AC system fault according to an embodiment of the present disclosure.
Figure 8:
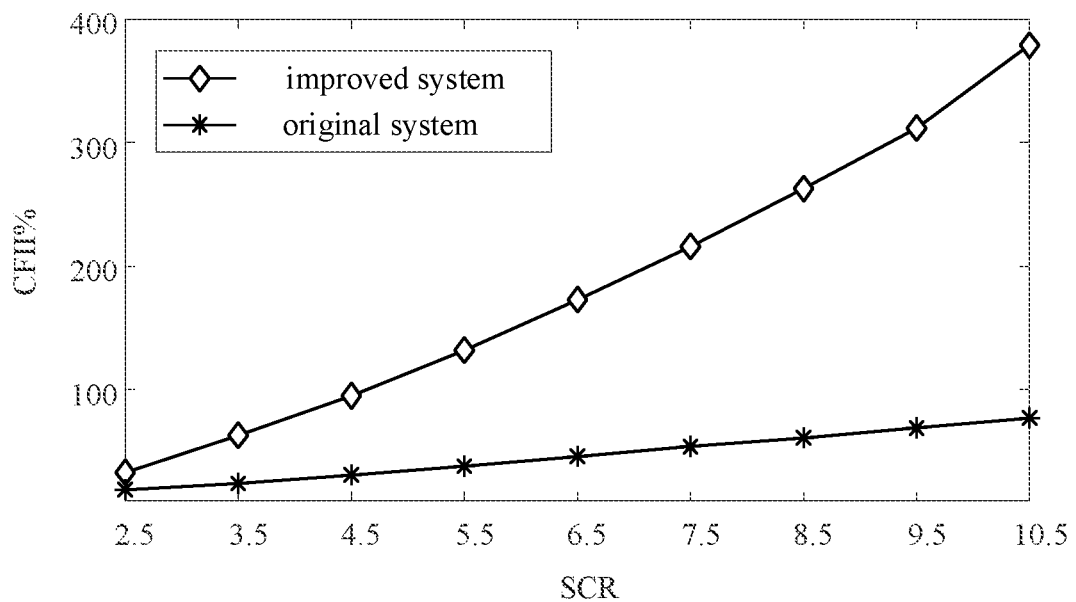
FIG. 8 is a schematic diagram illustrating the comparison of commutation failure immunity performance of the system under a three-phase fault before and after improvement by a method for suppressing a first HVDC commutation failure under an AC system fault according to an embodiment of the present disclosure.

FIG. 4 shows schematic waveform diagrams of the DC voltage, current, power and extinction angle of a transmission system under a single-phase fault, before and after improvement by a method for suppressing a first HVDC commutation failure under an AC system fault according to an embodiment of the present disclosure. FIG. 5 shows schematic waveform diagrams of the DC voltage, current, power and extinction angle of a transmission system under a three-phase fault, before and after improvement by a method for suppressing a first HVDC commutation failure under an AC system fault according to an embodiment of the present disclosure. FIG. 6 shows a schematic waveform diagram of a trigger-angle command of an inverter side of a transmission system under a single-phase fault, before and after improvement by a method for suppressing a first HVDC commutation failure under an AC system fault according to an embodiment of the present disclosure. FIG. 7 is a schematic diagram illustrating the comparison of commutation failure immunity performance of the system under a three-phase fault before and after improvement by a method for suppressing a first HVDC commutation failure under an AC system fault according to an embodiment of the present disclosure. FIG. 8 is a schematic diagram illustrating the comparison of commutation failure immunity performance of the system under a three-phase fault before and after improvement by a method for suppressing a first HVDC commutation failure under an AC system fault according to an embodiment of the present disclosure.

As shown in FIGS. 4 to 8, in the embodiment of the present disclosure, the trigger-angle command for an extinction-angle controller is used as the upper limit value of the output of the extinction-angle controller of the HVDC transmission system, to adjust or correct the trigger angle of the HVDC transmission system, effectively reducing the probability of the first commutation failure under an AC system fault, and thus suppressing the commutation failure of the HVDC transmission system.

Second Embodiment

Figure 9:
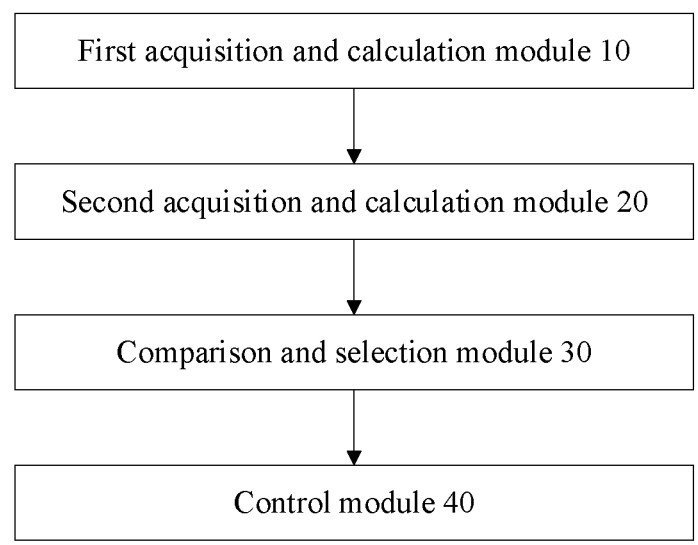
FIG. 9 is a block diagram of an apparatus for suppressing a first HVDC commutation failure under an AC system fault according to an embodiment of the present disclosure.

FIG. 9 is a block diagram of an apparatus for suppressing a first HVDC commutation failure under an AC system fault according to an embodiment of the present disclosure.

As shown in FIG. 9, an embodiment of the present disclosure provides an apparatus for suppressing a first high-voltage direct-current (HVDC) commutation failure under an alternative current (AC) system fault, which is applied to an HVDC transmission system, and includes a first acquisition and calculation module 10, a second acquisition and calculation module 20, a comparison and selection module 30, and a control module 40.

The first acquisition and calculation module 10 is configured to obtain a three-phase voltage of a converter bus in the HVDC transmission system, and calculating a zero-sequence component amplitude and an αβ component amplitude of the three-phase voltage of the converter bus.

The second acquisition and calculation module 20 is configured to obtain a setting value of an extinction angle of the HVDC transmission system, a per unit value of a short-circuit reactance of a converter, a per unit value of a DC current, a commutation time and an impedance ratio, and calculate a first trigger-angle command for a single-phase fault and a second trigger-angle command for a three-phase fault according to the zero-sequence component amplitude and the αβ component amplitude.

The comparison and selection module 30 is configured to select a smaller one of the first trigger angle command and the second trigger angle command as a trigger-angle command for an extinction-angle controller controlling a converter valve in the converter.

The control module 40 is configured to adjust a trigger angle of the HVDC transmission system by using the trigger-angle command for the extinction-angle controller as an upper limit value for an output of the extinction-angle controller of the HVDC transmission system.

In an embodiment, the first acquisition and calculation module 10 includes a data acquisition submodule, a first calculation submodule, a second calculation submodule and a third calculation submodule.

The data acquisition submodule is configured to obtain the three-phase voltage of the converter bus in the HVDC transmission system, where the three-phase voltage includes a Phase A voltage $u_A$, a Phase B voltage $u_B$, and a Phase C voltage $u_C$.

The first calculation submodule is configured to derive a zero-sequence component, a α component and a β component by substituting the Phase A voltage $u_A$, the Phase B voltage $u_B$, and the Phase C voltage $u_C$ into a zero-sequence component formula and a Clark transformation formula.

The second calculation submodule is configured to calculate the zero-sequence component amplitude $U_0$ by applying a maximum value holding function on the zero-sequence component.

The third calculation submodule is configured to calculate a pre-αβ component amplitude $U_L$ by applying a commutation voltage formula on the α component and the β component, and calculating the αβ component amplitude $U_L'$ by applying a minimum value holding function on the pre-αβ component amplitude $U_L$.

The zero-sequence component formula is $$u_0 = \left(\frac{(u_A + u_B + u_C)}{3}\right);$$

the Clark transformation formula is:

$$\begin{bmatrix} u_\alpha \\ u_\beta \end{bmatrix} = \frac{1}{3}\begin{bmatrix} 2 & -1 & -1 \\ 0 & \sqrt{3} & -\sqrt{3} \end{bmatrix}\begin{bmatrix} u_A \\ u_B \\ u_C \end{bmatrix};$$

the maximum value holding function is: $U_0=\text{MAX\_HOLD}(|u_0|)$; the commutation voltage formula is: $U_L=\sqrt{3u_\alpha^2+3u_\beta^2}$; and the minimum value holding function is: $U_L'=\text{MAX\_HOLD}(|U_L|)$.

In an embodiment, the second acquisition and calculation module 20 is further configured to substitute the setting value of the extinction angle of the HVDC transmission system, the per unit value of the short-circuit reactance of the converter, the per unit value of the DC current, the commutation time and the impedance ratio, the zero-sequence component magnitude and the αβ component magnitude into a single-phase trigger-angle calculation formula and a three-phase trigger-angle calculation formula to respectively obtain the first trigger-angle command $α_{sig}$ for the single-phase fault and the second trigger-angle command $α_{thr}$ for the three-phase fault. The single-phase trigger-angle calculation formula is:

$$\alpha_{3y.ord} = \arccos\left[\frac{X_T^*\left(2I_d^* + T\frac{dI_d^*}{dt}\right)}{\sqrt{3(1-kU_0^*)^2+1}} - \cos\gamma_{ref}\right] - \arctan\left(\frac{\sqrt{3}kU_0^*}{4-3kU_0^*}\right)$$

The three-phase trigger-angle calculation formula is:

$$\alpha_{thr} = \arccos\left[\frac{3X_T^*\left(2I_d^* + T\frac{dI_d^*}{dt}\right)}{2U_L'} - \cos\gamma_{ref}\right]$$

In the above formulas, k is the impedance ratio of the HVDC transmission system, $\gamma_{ref}$ is the setting value of the extinction angle, $X_T^*$ is the per unit value of the short-circuit reactance of the converter, $I_d^*$ is the per unit value of the DC current, and $U_0^*$ is a per unit value of the zero-sequence component amplitude $U_0$, $U_L'$ is the αβ component amplitude, and T is the commutation time of the converter valve in the converter of the HVDC transmission system.

It should be noted that the modules in the apparatus of the second embodiment correspond to the steps in the method of the first embodiment, details of which will not be repeated herein.

Third Embodiment

An embodiment of the present disclosure provides a computer readable storage medium. The computer storage medium is used to store computer instructions. The computer instructions, when being executed by a computer, cause the computer to perform the above method for suppressing a first HVDC commutation failure under an AC system fault.

Fourth Embodiment

An embodiment of the present disclosure provides a device for suppressing a first HVDC commutation failure under an AC system fault, including a processor and a memory.

The memory is configured to store a program and transmit the program to the processor.

The process is configured to execute the program to perform the above method for suppressing a first HVDC commutation failure under an AC system fault.

It should be noted that the processor is configured to perform the steps in the above method embodiment for suppressing a first HVDC commutation failure under an AC system fault, or perform the functions of the modules/units in the above system/apparatus embodiment by executing a computer program.

Exemplarily, a computer program may be divided into one or more modules/units, and the one or more modules/units are stored in a memory and executed by a processor to implement the technical solution of the present disclosure. The one or more modules/units may be a series of computer program instruction segments used for implementing specific functions, where the instruction segments are used to describe the execution process of the computer program in a terminal device.

The terminal device may be a computing device, such as a desktop computer, a notebook, a PDA, and a cloud server. The terminal device may include, but are not limited to, a processor and a memory. Those skilled in the art can understand that this does not constitute a limitation on the terminal device. The terminal device may include more or fewer components than those shown in the figure, or a combination of some components, or other components. For example, the terminal device may also include input and output devices, a network access device, a bus, and the like.

The processor may be a central processing unit (CPU), or other general-purpose processor, a digital signal processor (DSP), an application specific integrated circuit (ASIC), a field-programmable gate array (FPGA) or other programmable logic device, a discrete gate or transistor logic device, a discrete hardware components, or the like. The general-purpose processor may be a microprocessor or any other conventional processor.

The memory may be an internal storage unit of the terminal device, such as a hard disk or memory of the terminal device. The memory may alternatively be an external storage device equipped on the terminal device, such as a plug-in hard disk, a smart media card (SMC), a secure digital (SD) card, a flash card. Furthermore, the memory may include both an internal storage unit of the terminal device and an external storage device. The memory is used to store computer programs and other programs and data required by the terminal device. The memory can further be used to temporarily store data that has been output or is to be output.

Those skilled in the art can clearly understand that for the convenience and conciseness of description, the specific working processes of the above systems, devices and units are not described herein, and one can refer to the corresponding processes in the foregoing method embodiments for details.

In the several embodiments provided in the present disclosure, it should be understood that the disclosed systems, devices and methods can be implemented in other manners. For example, the device embodiments described above are only illustrative, and the division of the units is only a logical function division. In actual implementation, there may be other division methods. For example, multiple units or components may be combined or integrated into another system, and some features can be ignored or not implemented. In addition, the coupling or direct coupling or communication connection shown or discussed may be indirect coupling or communication connection through some interfaces, devices or units, and may be in electrical, mechanical or other forms.

The units described as separate components may be or may not be physically separated, and the components shown as units may or may not be physical units, that is, they may be located in the same place, or may be distributed to multiple network units. Some or all of the units may be selected according to actual needs to achieve the purpose of the technical solutions of the present disclosure.

In addition, the functional units in various embodiments of the present disclosure may be integrated into the same processing unit, or may exist physically alone, or two or more of the units may be integrated together. The above integrated units may be implemented in the form of hardware or software functional units.

If the integrated unit is implemented in the form of software functional units and sold or used as an independent product, it may be stored in a computer readable storage medium. Based on such an understanding, the essence of the technical solution of the present disclosure or the part that contributes to the prior art or all or part of the technical solution can be embodied in the form of a software product, and the computer software product is stored in a storage medium, including several instructions to make a computer device (which may be a personal computer, a server, or a network device, etc.) execute all or part of the steps of the method described in the embodiments of the present disclosure. The aforementioned storage medium includes: a U disk, a mobile hard disk, a read-only memory (ROM), a random access memory (RAM), a magnetic disk, an optical disk, or other medium that can store program code.

The above embodiments are provided only for illustration of the technical solutions of the present disclosure, rather than limitation. Although the technical solutions has been described in detail with reference to the foregoing embodiments, those of ordinary skill in the art should understand that the technical solutions in the embodiments can be modified, or some technical features can be replaced by equivalents. These modifications or replacements do not make the essence of the corresponding technical solutions deviate from the spirit and scope of the technical solutions of the present disclosure.

The invention claimed is:

1. A method for suppressing a first high-voltage direct-current (HVDC) commutation failure under an alternative current (AC) system fault, applied to an HVDC transmission system, the method comprising:
   obtaining a three-phase voltage of a converter bus in the HVDC transmission system, and calculating a zero-sequence component amplitude and an αβ component amplitude of the three-phase voltage of the converter bus;
   obtaining a setting value of an extinction angle of the HVDC transmission system, a per unit value of a short-circuit reactance of a converter, a per unit value of a DC current, a commutation time and an impedance ratio, and calculating a first trigger-angle command for a single-phase fault and a second trigger-angle command for a three-phase fault according to the zero-sequence component amplitude and the αβ component amplitude;
   selecting a smaller one of the first trigger angle command and the second trigger angle command as a trigger-angle command for an extinction-angle controller controlling a converter valve in the converter; and
   adjusting a trigger angle of the HVDC transmission system by using trigger-angle command for the extinction-angle controller as an upper limit value for an output of the extinction-angle controller of the HVDC transmission system.

2. The method for suppressing a first HVDC commutation failure under an AC system fault according to claim 1, wherein the obtaining a three-phase voltage of a converter bus in the HVDC transmission system, and calculating a zero-sequence component amplitude and an αβ component amplitude of the three-phase voltage of the converter bus comprises:
   obtaining the three-phase voltage of the converter bus in the HVDC transmission system, wherein the three-phase voltage comprises a Phase A voltage $u_A$, a Phase B voltage $u_B$, and a Phase C voltage $u_C$;

deriving a zero-sequence component, a $\alpha$ component and a $\beta$ component by substituting the Phase A voltage $u_A$, the Phase B voltage $u_B$, and the Phase C voltage $u_C$ into a zero-sequence component formula and a Clark transformation formula;

calculating the zero-sequence component amplitude $U_0$ by applying a maximum value holding function on the zero-sequence component; and calculating a pre-$\alpha\beta$ component amplitude $U_L$ by applying a commutation voltage formula on the $\alpha$ component and the $\beta$ component, and calculating the $\alpha\beta$ component amplitude $U_L'$ by applying a minimum value holding function on the pre-$\alpha\beta$ component amplitude $U_L$.

3. The method for suppressing a first HVDC commutation failure under an AC system fault according to claim 2, wherein the zero-sequence component formula is $u_0=((u_A+u_B+u_C)/3)$;

the Clark transformation formula is:

$$\begin{bmatrix} u_\alpha \\ u_\beta \end{bmatrix} = \frac{1}{3}\begin{bmatrix} 2 & -1 & -1 \\ 0 & \sqrt{3} & -\sqrt{3} \end{bmatrix}\begin{bmatrix} u_A \\ u_B \\ u_C \end{bmatrix}$$

the maximum value holding function is: $U_0=\text{MAX\_HOLD}(|u_0|)$;

the commutation voltage formula is: $U_L=\sqrt{3u_\alpha^2+3u_\alpha^2}$; and the minimum value holding function is: $U_L'=\text{MAX\_HOLD}(|U_L|)$.

4. The method for suppressing a first HVDC commutation failure under an AC system fault according to claim 2, further comprising: maintaining an absolute value of the zero-sequence component and an absolute value of the pre-$\alpha\beta$ component amplitude for 12 ms, to calculate the zero-sequence component amplitude $U_0$ and the $\alpha\beta$ component amplitude $U_L'$.

5. The method for suppressing a first HVDC commutation failure under an AC system fault according to claim 1, further comprising:

substituting the setting value of the extinction angle of the HVDC transmission system, the per unit value of the short-circuit reactance of the converter, the per unit value of the DC current, the commutation time and the impedance ratio, the zero-sequence component magnitude and the $\alpha\beta$ component magnitude into a single-phase trigger-angle calculation formula and a three-phase trigger-angle calculation formula to respectively obtain the first trigger-angle command $\alpha_{sig}$ for the single-phase fault and the second trigger-angle command $\alpha_{thr}$ for the three-phase fault, wherein the single-phase trigger-angle calculation formula is:

$$\alpha_{3y.ord} = \arccos\left[\frac{X_T^*\left(2I_d^*+T\frac{dI_d^*}{dt}\right)}{\sqrt{23(1-kU_0^*)^2+1}} - \cos\gamma_{ref}\right] - \arctan\left(\frac{\sqrt{3}kU_0^*}{4-3kU_0^*}\right)$$

the three-phase trigger-angle calculation formula is:

$$\alpha_{thr} = \arccos\left[\frac{3X_T^*\left(2I_d^*+T\frac{dI_d^*}{dt}\right)}{2U_L'} - \cos\gamma_{ref}\right]$$

where, k is the impedance ratio of the HVDC transmission system, $\gamma_{ref}$ is the setting value of the extinction angle, $X_T^*$ is the per unit value of the short-circuit reactance of the converter, $I_d^*$ is the per unit value of the DC current, and $U_0^*$ is a per unit value of the zero-sequence component amplitude $U_0$, $U_L'$ is the $\alpha\beta$ component amplitude, and T is the commutation time of the converter valve in the converter of the HVDC transmission system.

6. A computer readable storage medium, storing computer instructions, wherein the computer instructions, when being executed by a computer, cause the computer to perform the method for suppressing a first HVDC commutation failure under an AC system fault according to claim 1.

7. A device for suppressing a first high-voltage direct-current (HVDC) commutation failure under an alternative current (AC) system fault, comprising a processor and a memory, wherein the memory is configured to store a program and transmit the program to the processor, and the processor is configured to execute the program to perform the method for suppressing a first HVDC commutation failure under an AC system fault according to claim 1.

8. An apparatus for suppressing a first high-voltage direct-current (HVDC) commutation failure under an alternative current (AC) system fault, applied to an HVDC transmission system, and comprising a first acquisition and calculation module, a second acquisition and calculation module, a comparison and selection module, and a control module, wherein the first acquisition and calculation module is configured to obtain a three-phase voltage of a converter bus in the HVDC transmission system, and calculate a zero-sequence component amplitude and an $\alpha\beta$ component amplitude of the three-phase voltage of the converter bus;

the second acquisition and calculation module is configured to obtain a setting value of an extinction angle of the HVDC transmission system, a per unit value of a short-circuit reactance of a converter, a per unit value of a DC current, a commutation time and an impedance ratio, and calculate a first trigger-angle command for a single-phase fault and a second trigger-angle command for a three-phase fault according to the zero-sequence component amplitude and the $\alpha\beta$ component amplitude;

the comparison and selection module is configured to select a smaller one of the first trigger angle command and the second trigger angle command as a trigger-angle command for an extinction-angle controller controlling a converter valve in the converter; and the control module is configured to adjust a trigger angle of the HVDC transmission system by using trigger-angle command for the extinction-angle controller as an upper limit value for an output of the extinction-angle controller of the HVDC transmission system.

9. The apparatus for suppressing a first HVDC commutation failure under an AC system fault according to claim 8, wherein the first acquisition and calculation module comprises a data acquisition submodule, a first calculation submodule, a second calculation submodule and a third calculation submodule;

the data acquisition submodule is configured to obtain the three-phase voltage of the converter bus in the HVDC transmission system, wherein the three-phase voltage comprises a Phase A voltage $u_A$, a Phase B voltage $u_B$, and a Phase C voltage $u_C$;

the first calculation submodule is configured to derive a zero-sequence component, a α component and a β component by substituting the Phase A voltage $u_A$, the Phase B voltage $u_B$, and the Phase C voltage $u_C$ into a zero-sequence component formula and a Clark transformation formula;

the second calculation submodule is configured to calculate the zero-sequence component amplitude $U_0$ by applying a maximum value holding function on the zero-sequence component; and the third calculation submodule is configured to calculate a pre-αβ component amplitude $U_L$ by applying a commutation voltage formula on the α component and the β component, and calculating the αβ component amplitude $U_L'$ by applying a minimum value holding function on the pre-αβ component amplitude $U_L$, wherein the zero-sequence component formula is $u_0 = ((u_A + u_B + u_C)/3)$;

the Clark transformation formula is:

$$\begin{bmatrix} u_\alpha \\ u_\beta \end{bmatrix} = \frac{1}{3} \begin{bmatrix} 2 & -1 & -1 \\ 0 & \sqrt{3} & -\sqrt{3} \end{bmatrix} \begin{bmatrix} u_A \\ u_B \\ u_C \end{bmatrix}$$

the maximum value holding function is: $U_0 = \text{MAX\_HOLD}(|u_0|)$;

the commutation voltage formula is: $U_L = \sqrt{3u_\alpha^2 + 3u_\beta^2}$; and the minimum value holding function is: $U_L' = \text{MAX\_HOLD}(|U_L|)$.

10. The apparatus for suppressing a first HVDC commutation failure under an AC system fault according to claim 8, wherein the second acquisition and calculation module is further configured to substitute the setting value of the extinction angle of the HVDC transmission system, the per unit value of the short-circuit reactance of the converter, the per unit value of the DC current, the commutation time and the impedance ratio, the zero-sequence component magnitude and the αβ component magnitude into a single-phase trigger-angle calculation formula and a three-phase trigger-angle calculation formula to respectively obtain the first trigger-angle command $\alpha_{sig}$ for the single-phase fault and the second trigger-angle command $\alpha_{thr}$ for the three-phase fault, wherein the single-phase trigger-angle calculation formula is:

$$\alpha_{3y.ord} = \arccos\left[\frac{X_T^*\left(2I_d^* + T\frac{dI_d^*}{dt}\right)}{\sqrt{23(1-kU_0^*)^2 + 1}} - \cos\gamma_{ref}\right] - \arctan\left(\frac{\sqrt{3}kU_0^*}{4 - 3kU_0^*}\right)$$

the three-phase trigger-angle calculation formula is:

$$\alpha_{thr} = \arccos\left[\frac{3X_T^*\left(2I_d^* + T\frac{dI_d^*}{dt}\right)}{2U_L'} - \cos\gamma_{ref}\right]$$

where, k is the impedance ratio of the HVDC transmission system, $\gamma_{ref}$ is the setting value of the extinction angle, $X_T^*$ is the per unit value of the short-circuit reactance of the converter, $I_d^*$ is the per unit value of the DC current, and $U_0^*$ is a per unit value of the zero-sequence component amplitude $U_0$, $U_L'$ is the αβ component amplitude, and T is the commutation time of the converter valve in the converter of the HVDC transmission system.

\* \* \* \* \*